Nov. 12, 1968     E. JOHNS ET AL     3,410,136
DIFFERENTIAL TEMPERATURE WELL LOGGING APPARATUS
Filed Aug. 15, 1966
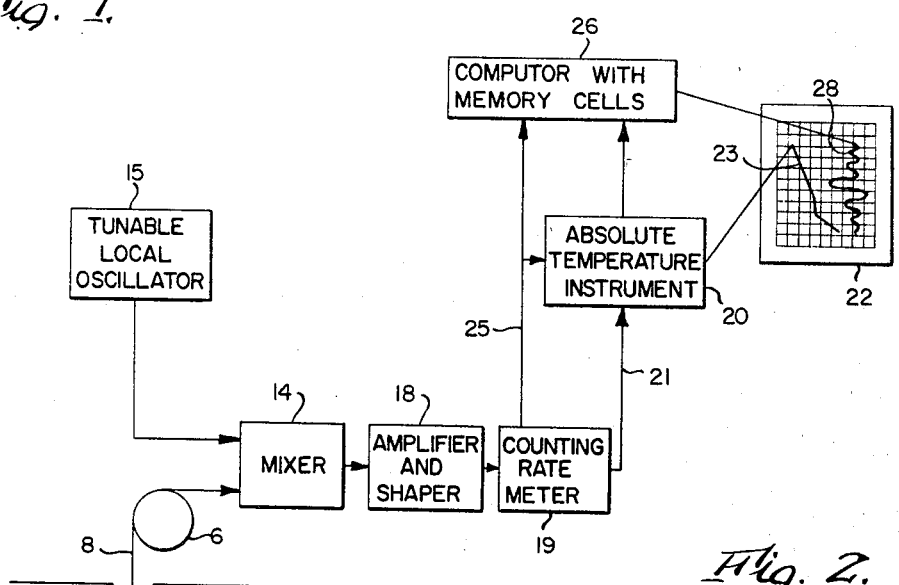
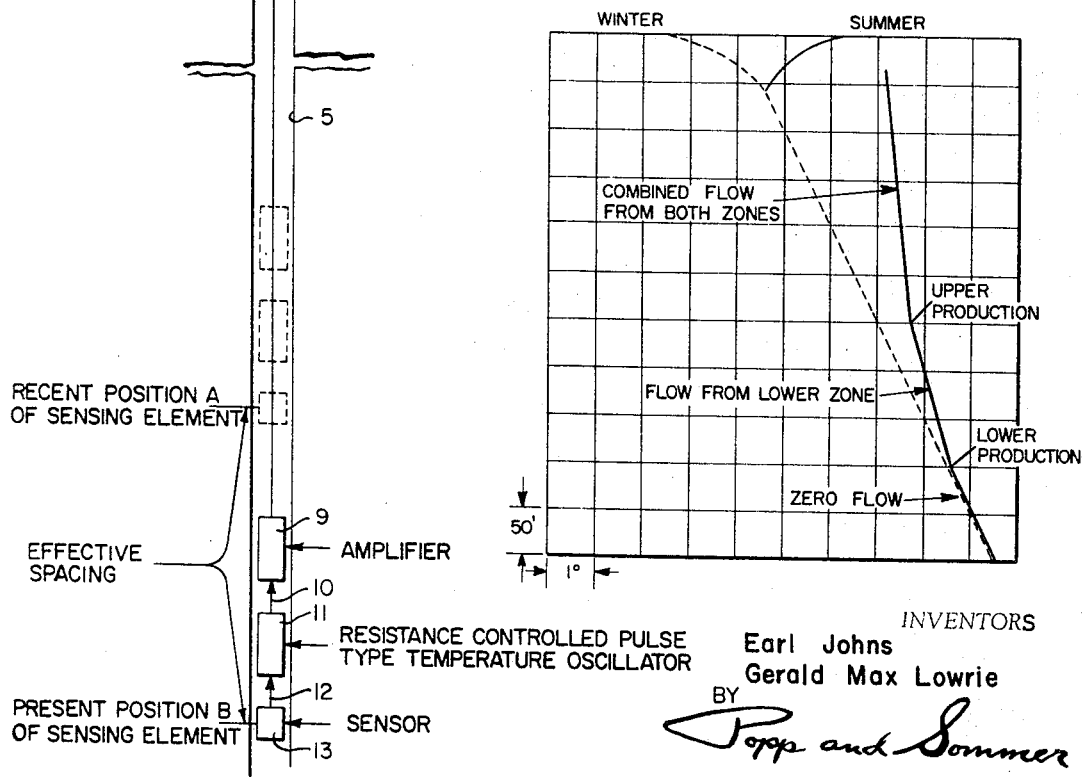
INVENTORS
Earl Johns
Gerald Max Lowrie
BY
*Popp and Sommer*
ATTORNEYS

United States Patent Office 3,410,136
Patented Nov. 12, 1968

3,410,136
DIFFERENTIAL TEMPERATURE WELL LOGGING APPARATUS
Earl Johns and Gerald Max Lowrie, Fort Worth, Tex., assignors to Gearhart-Owen Industries, Inc., Fort Worth, Tex., a corporation of Texas
Filed Aug. 15, 1966, Ser. No. 572,505
3 Claims. (Cl. 73—154)

ABSTRACT OF THE DISCLOSURE

A device for recording borehole parameters in which the measured values are stored in a memory means and differential values are obtained by comparing the measured values with previously measured values taken from the memory means.

---

This invention relates to tracing fluid movement in wells and more particularly to apparatus for surveying and recording the differential between temperatures in wells at different levels.

The principal object of the invention is to provide such apparatus which will provide a continuous graph or similar record, from virgin, undisturbed absolute values, of such temperature differential while lowering the sensing apparatus in the well, the principal feature of the invention being that the reading of the sensing apparatus at the higher level is stored in memory cells of a computer following which the sensing apparatus is lowered and its later reading compared by this computer with the reading of the memory cells and the difference charted or recorded.

Another object is to provide such apparatus which is not tied down to a fixed spacing between the points at which the two readings are taken and differentiated, the apparatus being usable to compare and differentiate the absolute temperatures at any distance apart in the well and it also being a matter of mathematics to determine any desired effective spacing of the two readings without changing the downhole tool in any way.

Another object is to provide such apparatus which is extremely sensitive and will record such temperature differentials with a high degree of accuracy and sensitivity.

Other objects and advantages of the invention will be apparent from the following description and drawings in which FIG. 1 is a diagrammatic representation of apparatus embodying the invention being used to log a well. FIG. 2 is a graph of a temperature log of a liquid producing well with the depth plotted against temperature and also showing the basic parameters of the mean surface temperature and natural geothermal gradient.

The graph, FIG. 2, illustrates the importance of determining, in well logging, accurate temperature differentials at different well depths with a high degree of sensitivity.

The graph shows in dotted lines the basic parameters against which all well temperature variations must be evaluated, namely, the natural geothermal gradient and the mean surface temperature. The mean surface temperature is the earth's temperature at the shallowest depth unaffected by seasonal variations and the geothermal gradient is a, more or less, increase of the earth's temperature due to the hot molten nature of the earth's core. Excluding extremes this increase in the United States falls within a range of 1.0° to 1.3° F. per 100 feet.

Where the fluid in a well is static, and has been static for a long period, a temperature log of the well is that of the natural geothermal temperature and therefore reveals the natural geothermal gradient illustrated by the dotted line below the level of the mean surface temperature.

However, with fluid flow between the well bore and the surrounding formation the log departs from the natural geothermal gradient. If the flow rate were infinite there would be no temperature change along the well since, with a producing well for example, the fluid reaching the surface would exhibit the same temperature as the earth at the producing depth, having no time to exchange heat after leaving the producing depth. The temperature gradient of a well with fluid flow, either by way of production or with injection, is between these two extremes. With a producing well, the fluid leaves the formation at the earth temperature of the production depth and is modified by heat exchange as it rises in the bore. With injection, with fluids either above or below means surface temperature, at the zone of injection the temperature log tends to be straight because all of the zone that takes fluid, takes fluid at essentially the same temperature and an annulus of formation near the bore hole tends to take on the temperature that the fluid has on reaching this zone. With gas wells the pressure in the bore hole is much less than the pressure the gas is under within the formation. This decrease in pressure on reaching the bore hole allows the gas to expand. Since expansion requires heat, a temperature drop known as the Joule-Thompson effect takes place and the net result is that the bore hole temperature at points of gas entry is lower than the geothermal temperature.

In FIG. 2 there is represented in full lines an exemplary temperatures log of a producing liquid well with a lower section of no flow and two successive zones of liquid production resulting in three discrete slopes representing the three discrete flow rates: Zero flow below the lower zone, flow representing the lower zone's production between the two zones, and flow representing both zones' combined production from the upper zone to the surface.

The present invention relates to differential well logging apparatus because a differential temperature log is intrinsically capable of providing several advantages over the traditional absolute temperature log.

First, the temperature difference between two levels in the well can be known with much greater accuracy than the absolute temperature, since a change of 0.01° F., that might represent as much as 50% of the differential temperature might represent as little as 5/1000 of 1% of the absolute temperature.

Secondly, if an absolute temperature survey were to be presented at anywhere near the differential sensitivity, it would be a meaningless jumble of scale changes.

Finally, the absolute temperature log sometimes requires extending slopes to pinpoint changes whereas the differential log, in a sense, does this inherently by presenting different slopes as distinctly different lateral displacements.

Attempts have been made to provide a differential temperature tool, that is a tool that seeks to measure the difference in temperature between two proximate levels in the bore hole (usually two to eight feet apart). This approach was to employ two separate sensing elements, physically separated by a chosen fixed spacing. This type of tool had an irreparable shortcoming. Since the body of the tool was necessarily either a source or sink of heat (depending on conditions), the only true temperature log is one obtained by a leading sensing element, on a first run into the well. Although the erroneous reading of a trailing element, if absolutely unavoidable, might be tolerated in the large value of an absolute reading, it can be disastrous to often tiny differential value.

A well bore hole 5 to be logged is illustrated in FIG. 1 with a hoisting means 6 at the well head for a conductor cable 8 lowered into the bore hole. This conductor cable is the output line of an amplifier 9 the input line 10 to which supports a resistance controlled pulse oscillator 11. The input line 12 of this oscillator 11 supports the temperature sensor of the apparatus.

Preferably this temperature sensor is a type of thermistor modified to have a linear, positive temperature coefficient of resistance and commonly referred to as a sensistor. As with thermistors, the sensing element of a sensistor is a temperature sensitive metal oxide semiconductor, usually composed of a mixture of several different oxides. Current through this sensing element is modified by its temperature and the sensistor is an outgrowth of transistor technology having, like the original thermistor, high temperature sensitivity but, unlike the original thermistor which had non-linear, negative temperature coefficient of resistance, having a linear, positive temperature coefficient of resistance. Sensistors are quite small and readily capsulated for maximum sensitivity.

The output from the sensistor is fed to a resistance controlled oscillator the output of which is amplified by the amplifier 9. This temperature oscillator 11 preferably operates at a frequency many times higher than temperature oscillators heretofore used and this high frequency is heterodyned in a mixer 14 with the output of a highly stable, tunable, local oscillator 15 at the surface. The difference or beat frequency from the mixer is amplified in an amplifier and shaper 18 and this relatively low difference or beat frequency is readily counted by ordinary techniques in a counting rate meter 19. If desired, the output from the counting rate meter can be fed to an absolute temperature instrument 20 via a branch output line 21 and this instrument can operate a recorder 22 to produce a graph log 23 of changes in absolute temperature in the well bore 5 as the sensor 13 descends. This absolute temperature recording is instantaneous and hence in the full line or B level position of the sensor shown in FIG. 1, this would be a B level recording.

The feature of the invention resides, however, in feeding the output of the counting rate meter, via a branch line 25 to a computor 26 having memory cells for storing an earlier reading of the sensor 13, comparing it with a later reading of the sensor, computing the difference and actuating the recorder 22 to produce a graph log 28 of the differential temperature. Thus at the elevated dotted line position A, FIG. 1, the temperature reading of the sensor 13 is fed to the memory cells of the computor 26 and held there until the sensor 13 descends, say two feet to the position B. At position B the reading of the sensor 13 is fed to the computor 26 which computes the difference between it and the position A reading stored in its memory cells and records the differential temperature at 28. Of course, as the sensor moves down the well bore, the computor 26 constantly records the difference between the contemporaneous reading of the sensor 13 and its earlier reading at the assumed two feet higher elevation so as to produce a continuous log 28 of temperature differentials, at a two foot spacing, along the well bore.

From the foregoing it will be seen that the present invention provides a new tool in well logging characterized by comparing and recording, from virgin, undisturbed absolute temperature readings at spaced intervals, the difference between them and thereby provide a tool which is not only highly accurate but which can be made very sensitive to minute changes in absolute and differential values.

We claim:

1. Differential temperature well logging apparatus, comprising a temperature sensor adapted to be moved vertically in the well bore and responsive to the absolute temperature at each elevation thereof, computor means responsive to said sensor and having memory cells for storing the temperature reading at each elevation and being capable of computing the differential between the stored temperature reading and a subsequent reading of said sensor at a different elevation, and means responsive to said computor providing a log of such differential readings.

2. Well logging apparatus for recording the differences in a significant down-hole parameter as measured at the extremes of a predetermined increment of depth which increment is held constant over a range of absolute depth values, comprising a condition sensor, means for traversing said sensor through said well to develop first indications of the magnitude of said condition at points throughout a range of said depth values, means for deriving from said first indications a counterpart set of second indications corresponding to the magnitude of said condition at points displaced by a fixed increment of depth from the first points, and means for deriving from said first and second indications a set of differential condition values.

3. Differential temperature well logging apparatus for logging the temperature difference between vertically spaced levels in a well bore or the like, comprising a temperature sensing element, means for traversing said element through a range of depths in a well bore or the like through a continuous path, means responsive to the output of said element for registering first signals indicative of the temperature at successive points along said traverse range, means for transiently storing the successive signals to develop counterpart signals indicative of the temperature at successive points displaced from the first-named points, and means for comparing said first signals with said counterpart signals to develop output indications of the temperature differences between levels corresponding to the magnitude of such displacement.

References Cited

UNITED STATES PATENTS

| | | | |
|---|---|---|---|
| 2,352,247 | 6/1944 | Blau et al. | 73—154 |
| 2,676,489 | 4/1954 | Basham | 73—154 X |
| 3,122,016 | 2/1964 | Fordham | 73—154 |
| 3,217,550 | 11/1965 | Birman | 73—154 X |

RICHARD C. QUEISSER, *Primary Examiner.*

JERRY W. MYRACLE, *Assistant Examiner.*